United States Patent
Diallo et al.

(10) Patent No.: US 10,439,799 B2
(45) Date of Patent: Oct. 8, 2019

(54) SYSTEM AND METHOD FOR AUTOMATING INDIRECT FIRE PROTOCOL USING FULLY HOMOMORPHIC ENCRYPTION

(71) Applicants: Mamadou H. Diallo, San Diego, CA (US); Roger Alexander Hallman, San Diego, CA (US); Michael Anthony August, San Diego, CA (US); Megan Elane Monteverde Kline, San Diego, CA (US); Henry Gwok Wing Au, Honolulu, HI (US)

(72) Inventors: Mamadou H. Diallo, San Diego, CA (US); Roger Alexander Hallman, San Diego, CA (US); Michael Anthony August, San Diego, CA (US); Megan Elane Monteverde Kline, San Diego, CA (US); Henry Gwok Wing Au, Honolulu, HI (US)

(73) Assignee: United States of America as represented by Secretary of the Navy, Washington, DC (US)

(*) Notice: Subject to any disclaimer, the term of this patent is extended or adjusted under 35 U.S.C. 154(b) by 90 days.

(21) Appl. No.: 15/679,932

(22) Filed: Aug. 17, 2017

(65) Prior Publication Data

US 2018/0248683 A1  Aug. 30, 2018

Related U.S. Application Data

(60) Provisional application No. 62/464,070, filed on Feb. 27, 2017.

(51) Int. Cl.
*H04L 9/00* (2006.01)
*H04L 29/06* (2006.01)
(Continued)

(52) U.S. Cl.
CPC ............ *H04L 9/008* (2013.01); *G06F 21/602* (2013.01); *H04L 9/08* (2013.01); *H04L 63/0442* (2013.01);
(Continued)

(58) Field of Classification Search
CPC ......... H04L 9/008; H04L 67/18; H04L 67/10; G06F 21/602
See application file for complete search history.

(56) References Cited

U.S. PATENT DOCUMENTS

| | | | | |
|---|---|---|---|---|
| 5,943,009 A | * | 8/1999 | Abbott | B64C 5/02 342/357.44 |
| 6,237,496 B1 | * | 5/2001 | Abbott | F42B 10/64 102/384 |

(Continued)

OTHER PUBLICATIONS

Dong et al., "Evaluation of contribution rate of weapon equipment system of systems capability based on conditional evidential network," 2017 8th IEEE International Conference on Software Engineering and Service Science (ICSESS) Year: 2017 | Conference Paper | Publisher: IEEE.*

(Continued)

*Primary Examiner* — Roderick Tolentino
(74) *Attorney, Agent, or Firm* — Naval Information Warfare Center Pacific; Kyle Eppele; Arthur K. Samora

(57) ABSTRACT

Indirect fire protocol according to several embodiments of the present invention can include the initial step establishing a grid and locating a forward observer (FO) and a firing unit (FU) in the grid. The FO can estimate the bearing and range to a High Value Target (HVT) within the grid, and can homomorphically encrypting said HVT estimated position data. FO can then transmit the encrypted HVT estimated position data over cloud network architecture to a Fire Direction Center (FDC), using the FDC's $\text{Key}_{public}$. The FDC can outsource the calculation of an absolute position of (Continued)

said HVT in said grid to non-secure internet cloud architecture, but with encrypted HVT estimation data and the FO position data in the grid (which the FDC knows). Once calculated, the HVT encrypted absolute position data can be decrypted, and then transmitted from FDC to a FU, using the FU's $Key_{public}$.

10 Claims, 5 Drawing Sheets

(51) Int. Cl.
    *G06F 21/60*     (2013.01)
    *H04L 9/08*     (2006.01)
    *H04L 29/08*     (2006.01)

(52) U.S. Cl.
    CPC .............. *H04L 67/10* (2013.01); *H04L 67/18* (2013.01); *H04L 2463/062* (2013.01)

(56) References Cited

U.S. PATENT DOCUMENTS

| | | | |
|---|---|---|---|
| 9,645,842 B2 | 5/2017 | Bathen | |
| 9,729,312 B2 | 8/2017 | Bathen | |
| 9,871,772 B1* | 1/2018 | Weinstein | ........... H04L 63/0435 |
| 2004/0024566 A1* | 2/2004 | Hogan | ....................... F41G 3/08 |
| | | | 702/152 |
| 2007/0236384 A1* | 10/2007 | Ivtsenkov | .................. F41G 1/35 |
| | | | 342/45 |
| 2009/0045996 A1* | 2/2009 | Ivtsenkov | ............. A61B 5/6814 |
| | | | 342/45 |
| 2012/0192291 A1* | 7/2012 | Diem | ...................... G06Q 10/00 |
| | | | 726/28 |
| 2014/0251123 A1* | 9/2014 | Venema | ..................... F41G 3/16 |
| | | | 89/41.22 |
| 2015/0244517 A1* | 8/2015 | Nita | ......................... H04L 9/008 |
| | | | 713/168 |
| 2015/0312031 A1* | 10/2015 | Seo | ........................... H04L 9/008 |
| | | | 380/28 |

OTHER PUBLICATIONS

Xu, Zhi Ying, "Design and Development of Weapons and Equipment Manage System Based on RFID Technology," 2011 International Conference on Business Computing and Global Informatization Year: 2011 | Conference Paper | Publisher: IEEE.*

Diallo, Mamadou et al., "CaliForFire: A Mission-Critical Cloud-based Application Built Using the Nomad Framework", http://dx.doi.org/10.1007/978-3-662-53357-4_21, Feb. 2016.

Brakerski, Zvika et al., "Efficient Fully Homomorphic Encryption from (Standard) LWE", 2011 IEEE 52nd Annual Symposium on Foundations of Computer Science, Oct. 2011.

Diallo, Mamadou et al., "Nomad: A Framework for Developing Mission-Critical Cloud-based Applications", 2015 10th International Conference on Availability, Reliability and Security, pp. 660-666.

Homomorphic Encryption-Wikpedi, https://en.wikipedia.org/wiki/Homomorphic_encryption, Mar. 21, 2017.

Diallo, Mamadou et al., "The Nomad Project: Targeting Security and Availability Issues in the Cloud", US Cybersecurity Magazine, Spring 2016.

\* cited by examiner

SYSTEM AND METHOD FOR AUTOMATING INDIRECT FIRE PROTOCOL USING FULLY HOMOMORPHIC ENCRYPTION

CROSS REFERENCE TO RELATED APPLICATIONS

This application claims the benefit of U.S. Provisional Application 62/464,070, filed Feb. 17, 2017, by Mamadou H. Diallo, et al., entitled "System And Method For Automating Indirect Fire Protocol Using Fully Homomorphic Encryption". The contents of the '070 application are hereby incorporated by reference into this specification.

FEDERALLY SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 104345.

FIELD OF THE INVENTION

The present invention pertains generally to systems and methods for transmission of data. More particularly, the present invention pertains generally to systems and methods for transmission of data over the cloud using homomorphic encryption methods. The present invention is particularly, but not exclusively, useful as a geographic information system (GIS)-based mission-critical, cloud-based, homomorphic encryption data transmission application, which can enable secure computation of enemy target locations and selection of firing assets over an unsecure cloud network.

BACKGROUND OF THE INVENTION

Indirect fire can be thought of as aiming and firing a projectile at a target without relying on a direct line of sight between the gun and its target, as in the case of direct fire. Aiming for indirect fire can be performed by calculating azimuth and elevation angles, and may include correcting aim by observing the fall of shot and calculating new angles. Defense organizations may call for indirect/supporting fire during combat operations when it is impractical/not desired for the organization to engage the target itself. In a tactical environment, the indirect fire/supporting fire procedure can involve multiple players.

As mentioned above, indirect fire support can often involve a plurality of players. A Forward Observer (FO) can observe an adversary target, or "High Value Target" (HVT). The FO can determine the Observer Target distance ($OT_{distance}$) and bearing ($OT_{direction}$) using technology such as a laser range finder or other means. The FO can then transmit the ($OT_{distance}$, $OT_{direction}$) information to a "Fire Direction Center" (FDC) that is geographically remote to the FO. Since the FO location is already known to the FDC, the FDC can use the FO's position and the ($OT_{distance}$, $OT_{direction}$) data to calculate the HVT location. Once calculated, the HVT information location can be sent to one or more of a plurality of "Firing Units" (FUs), whose location can also be known to the FDC. The FUs can then use the HVT location, to "fire for effect" on the HVT.

The above-described indirect fire process for even a single HVT can involve a vast amount of data that is required to be generated, manipulated and transmitted between the FO, the FDC and the FU. If multiple HVT's, FO's and FUs are involved, and/or if the HVT is in motion (i.e. the HVT location is changing) the amount of data required to transmit can increase at a geometric rate. This location data could be transmitted via radio, but due to the amount of data to be transferred, the internet can be a more optimal mode of transmission. However, indirect fire can and often does occur in remote areas, out of range of internet servers, so a cloud internet configuration can be more optimal. But for cloud systems, the transmitted location data should be encrypted and in many instances the cloud internet configuration may be nonsecure/untrusted.

In view of the above, it can be an object of the present invention to provide a system and method for transmission of secure indirect fire data that can be transmitted via an unsecure cloud internet environment (i.e. without a trusted server). Another object of the present invention can be to provide a cloud-based system and method for transmission of indirect fire data that can be encrypted at the point of generation of fire data, prior to transmission to the cloud. Still another object of the present invention can be to provide a cloud-based system and method for transmission of indirect fire data that allows for computation of the data with decryption. Another object of the present invention can be to provide a cloud-based system and method for transmission of indirect fire data that is lattice-based and that is secure against quantum attacks. Yet another object of the present invention can be to provide a cloud-based system and method for transmission of indirect fire data that can use homomorphic encryption methods for encryption of the data. Another object of the present invention can be to provide a cloud-based system and method for transmission of indirect fire data that can be used in a cost-effective manner.

SUMMARY OF THE INVENTION

Methods and systems for accomplishing the methods for automatic indirect fire protocol according to several embodiments of the present invention can include the initial step establishing a grid. A forward observer (FO), high value target (HVT) and a firing unit (FU) can be located in the grid. The FO, HVT and FU can all have respective grid coordinates. The methods can also include the steps of determining the grid coordinates of the FO and the FU and estimating the position of the HVT in the grid relative to the FO, with the estimating step being accomplished by the FO. The FO can homomorphically encrypting the HVT estimated position data, and then can transmit the encrypted HVT estimated position data over a cloud network architecture to a Fire Direction Center (FDC), using the FDC's $Key_{public}$. The FDC can outsource the calculation of an absolute position of the HVT in the grid to an internet cloud architecture, using the encrypted HVT estimation data and the FO position data in the grid (which the FDC knows). Once calculated, the HVT encrypted absolute position data can be decrypted, and then transmitted to a FU, using the FU's $Key_{public}$. The encryption method used can be a Brakerski-Gentry-Vaikuntanathan (BGV) cryptosystem homomorphic encryption scheme.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
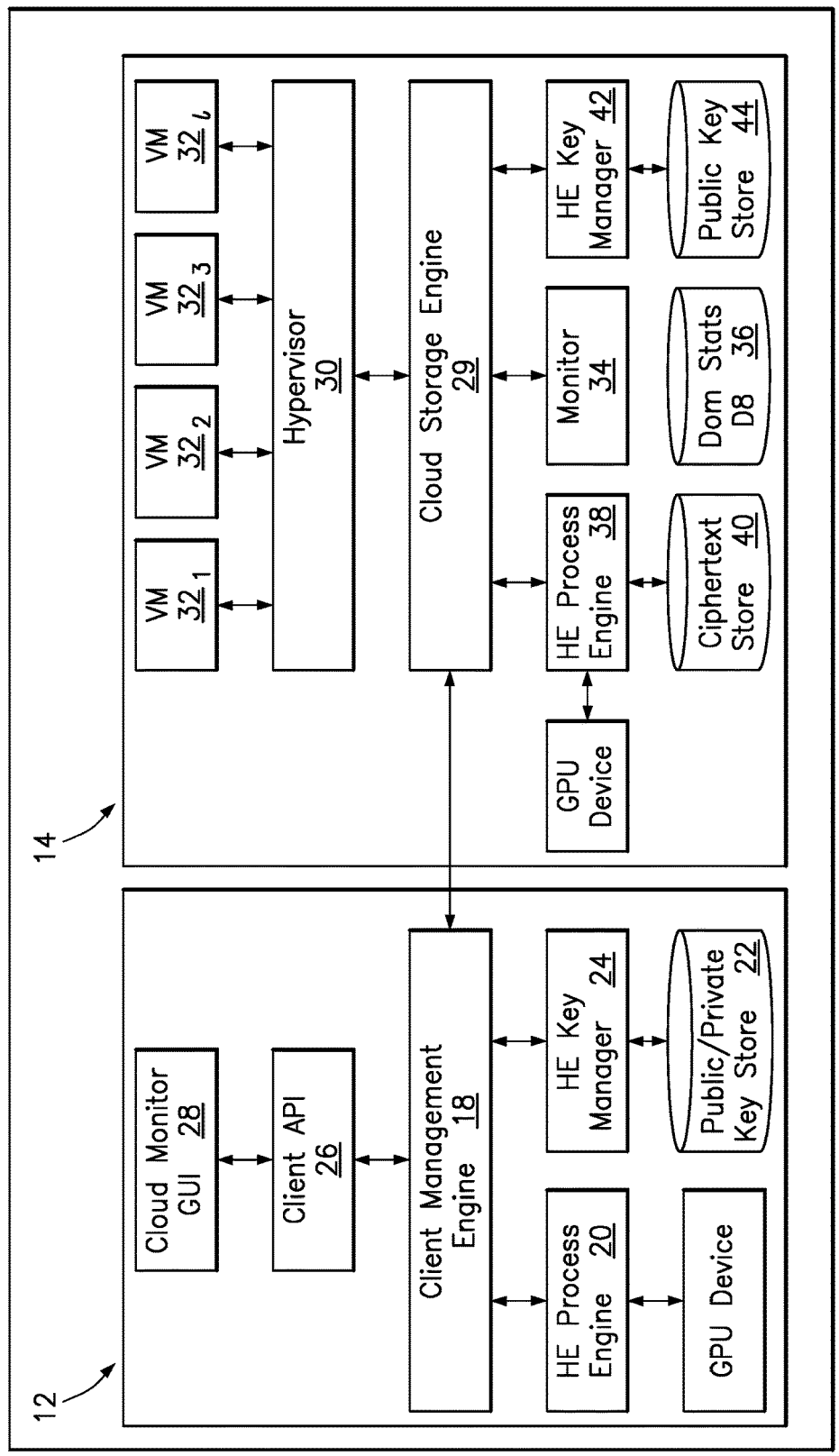
FIG. 1 is a top level block diagram of the Nomad framework high-level architecture.

In brief overview and referring initially to FIG. 1, a top level diagram of the Nomad framework overview can be seen and can be referred to using reference character 10. The Nomad framework 10 can provide building blocks for ensuring the confidentiality of the data stored and processed in the cloud by using Fully Homomorphic Encryption (FHE). It can abstract out the underlying mechanisms for protecting the data so that developers can focus on building the value-added capabilities of their applications. Thus, the framework 10 can have the benefits of speeding up and simplifying the development of secure applications deployed in the cloud.

Nomad framework 10 can be designed using the client/server architecture paradigm. The design is modular, which can enable extensibility and customization of the framework. The architecture of the framework is depicted in FIG. 1, which can be composed of two main components: the Client Management Service 12 and the Cloud Storage Service 14. It is assumed that the Client Management Service will be deployed in a trusted infrastructure, and that insider attacks are still a threat. The Cloud Storage Service is assumed to be deployed in a semi-trusted cloud infrastructure. The Client Management Service 12, the Cloud Storage Service 14, and an operational overview of Nomad 10 can be described more fully below.

The Client Management Service 12 can provide both the client management and graphical user interface for the system. It can consist of multiple components (see FIG. 1). The Client Management Engine 18 can orchestrate the client operations, which include encryption, decryption, homomorphic arithmetic operations, key generation, and key management. The client-side FHE Processing Engine 20 can be used for encrypting and decrypting the application's data. In order to store the data in the FHE-based storage, the following steps are performed: (1) homomorphic encryption is performed on the data using the public key, and (2) the public key is sent along with the cipher text to the server for storage. Note that the public key is needed by the server-side FHE Processing Engine in order to perform re-encryption (i.e. bootstrapping) and operations on the cipher text. The Public/Private Key Store 22 persists both the public and private keys associated with each user of the system. The client-side FHE Key Manager 24 can be responsible for generating public/private key pairs, storing or retrieving them in the Public/Private Key Store 22, and passing to HE process engine 20 through client management engine 18 for encrypting/decrypting data. The Client application program interface (API) 26 can be used for exposing these services to applications, and the Cloud Monitor GUI 28 can be used for monitoring the resource usage of the virtual machines in the cloud.

The Cloud Storage Service 14 can enable the deployment of trusted storage and computation services within a semi-trusted cloud environment (for purposes of this specification, semi-trusted can be taken to mean that some functions are assumed to be done perfectly but some may be compromised, for example storage may be exposed but computation is properly conducted). The Cloud Storage Engine 29 can orchestrate all of the operations of the Cloud Storage Service and provides the server side interface to the storage system. The cloud service provider's underlying hypervisor 30 can generate and can manage the Virtual Machines (VMs) $32_1$-$32_i$ which can host various cloud services for the cloud architecture 10 (for purposes of this Specification, "hypervisor" can be taken to mean computer software, firmware or hardware that creates, runs, and manages virtual machines). The Monitor 34 can collect the resource usage of each VM $32_i$ periodically, and can store it in the domain statistics database 36. The server-side FHE Processing Engine 38 can be used for processing the homomorphically encrypted data, and can stores the results along with the original cipher texts in the Ciphertext Store 40. The server-side FHE Key Manager 42 can keep track of the public keys 44 used to encrypt the data.

With respect to an operational overview, the operations performed by the Nomad framework can include encryption/decryption, storage, retrieval, deletion, and processing of the data. The Cloud Storage Service functionality is exposed to the client application via client management engine 18 and the Client API 26 of client management service 12.

The Client Management Service 12 can manage all of the keys, data, and operations on behalf of the client. At a high level, the client application data can be stored and processed in the cloud in encrypted form, then returned to the client application and decrypted for display to the end-user. When first using the system, the user must initialize the client and generate its own public/private key pair ($Key_{public}$, $Key_{private}$). In a deployment environment, key generation must be done by a trusted third party, as it is done with current certificate authorities. Alternatively, key management/distribution could be done using homomorphic encryption, as known in the prior art.

Data Storage Workflow. In this data storage workflow described below, it can be assumed that each user (Forward Observer, Fire Direction Center and Firing Unit, FO, FDC and FU) has a single public/private key pair ($Key_{public}$, $Key_{private}$) used for encrypting and decrypting its respective data:

1. System Initialization: Upon first using the system, the user (FO, FDC, FU) sends a request to the Client Management Engine 18 to generate a public/private key tuple (<$ID_{user}$; $Key_{public}$; $Key_{private}$>). The Client Management Engine forwards the request to the HE Key Manager to generate the key pair and store it in the Public/Private Key Store. The Client Management Engine also sends the tuple (<$ID_{user}$; $Key_{public}$>) to the Cloud Storage Engine for later usage. The Cloud Storage Engine calls on the HE Key Manager 42 to store the tuple (<$ID_{user}$; $Key_{public}$>) in the Public Key Store.

2. The user can initiate a request to store their $Data_{plaintext}$ in the cloud storage.

3. The Client Management Engine 18 can submit a request to encrypt the data to get the cipher text (Enc(<Data$_{plaintext}$; Key$_{public}$>)=<Data$_{ciphertext}$>).

4. The Client Management Engine 12 can submit a request to the Cloud Storage Engine 29 to store the ID/data tuple (<ID$_{user}$; ID$_{data}$; Data$_{ciphertext}$>).

5. The Cloud Storage Engine 29 can receive the storage request and can call on the HE Processing Engine 38 to store the data (<ID$_{user}$; ID$_{data}$; Data$_{ciphertext}$>) in the Ciphertext Store 40.

The Nomad 10 architecture is described in greater detail in U.S. patent application Ser. No. 14/697,785, by Luis Angel D. Bathen for an invention entitled "System and Method for High-Assurance Data Storage and Processing Based on Homomorphic Encryption", which is assigned to the same assignee as the present invention. The contents of the '785 application are hereby incorporated by reference herein.

Figure 2:
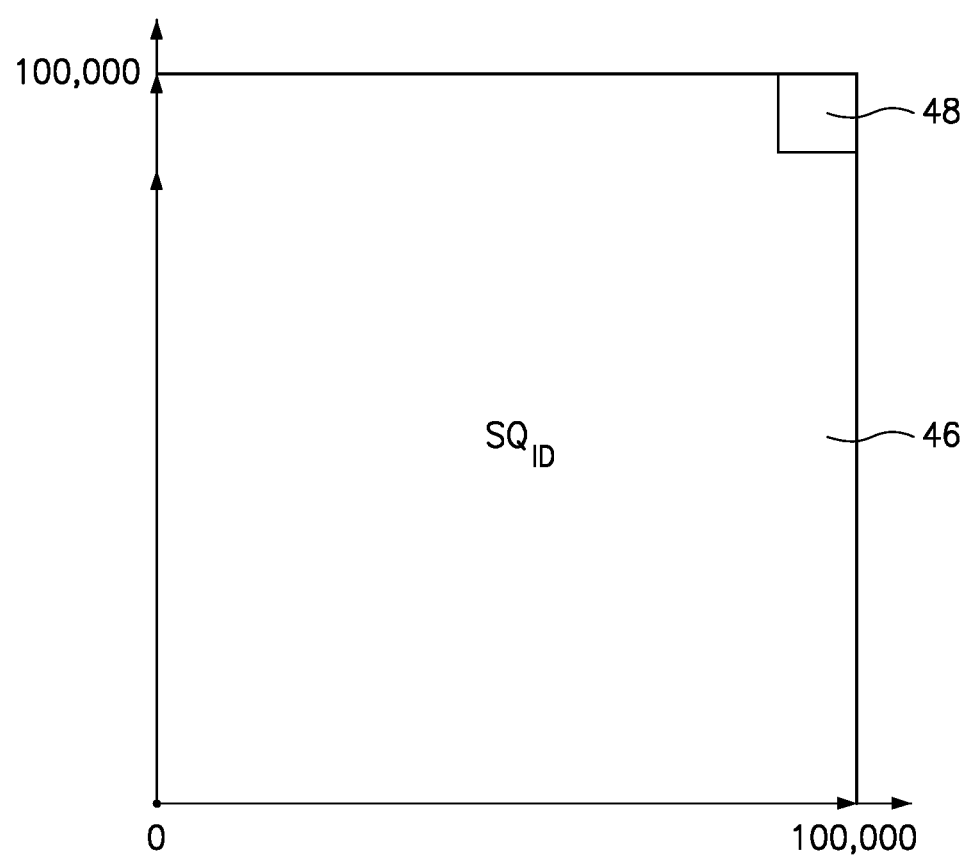
FIG. 2 is a plan view map of a grid used by the present invention according to several embodiments.
Figure 3:
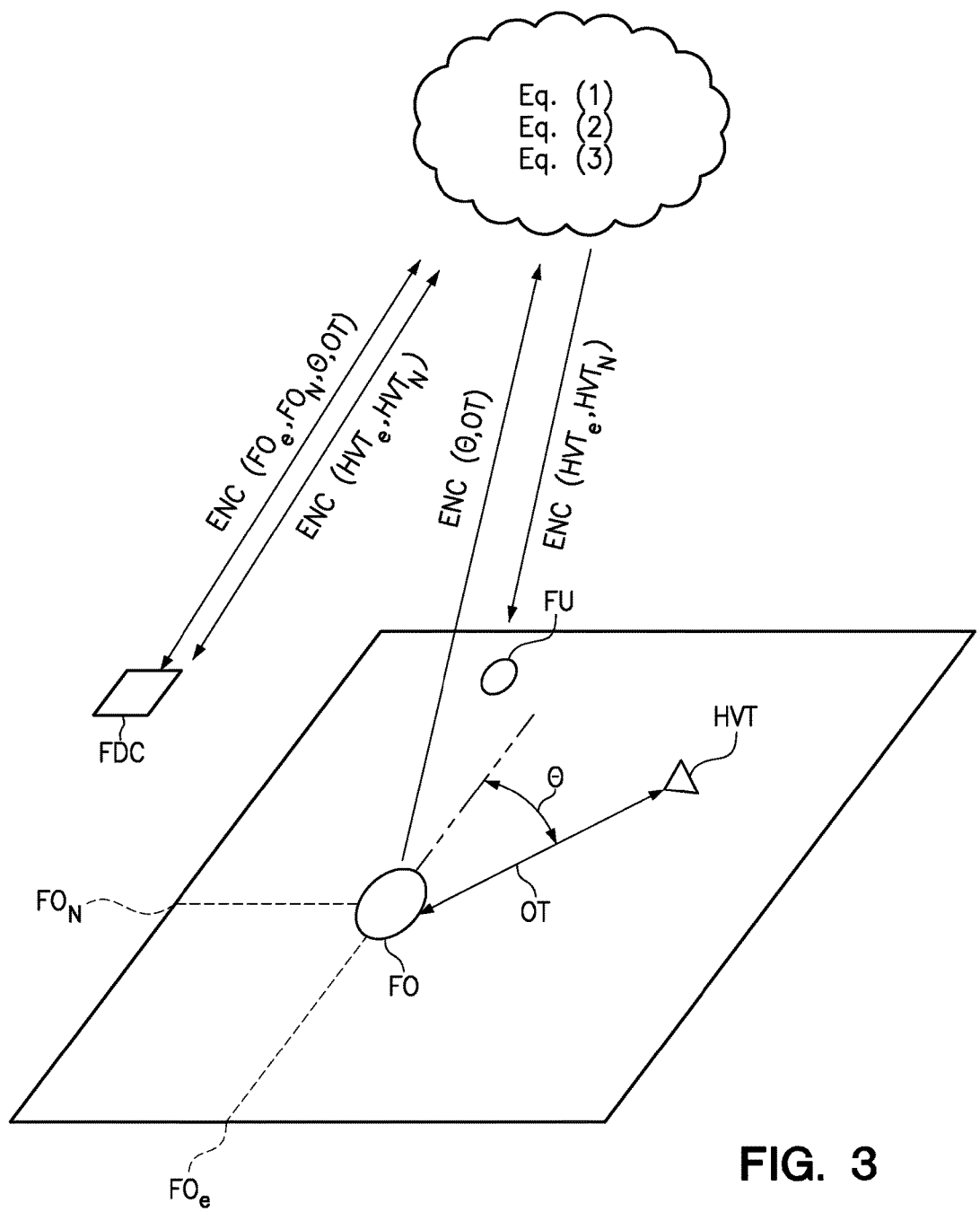
FIG. 3 is an illustration of a grid square from FIG. 2 with at least one High Value Target (HVT), Forward Observer (FO), Fire Direction Center (FDC) and Firing Unit (FU) shown, and which depicts data flow between the FO, FDC and FU and cloud architecture being used.
Figure 4:
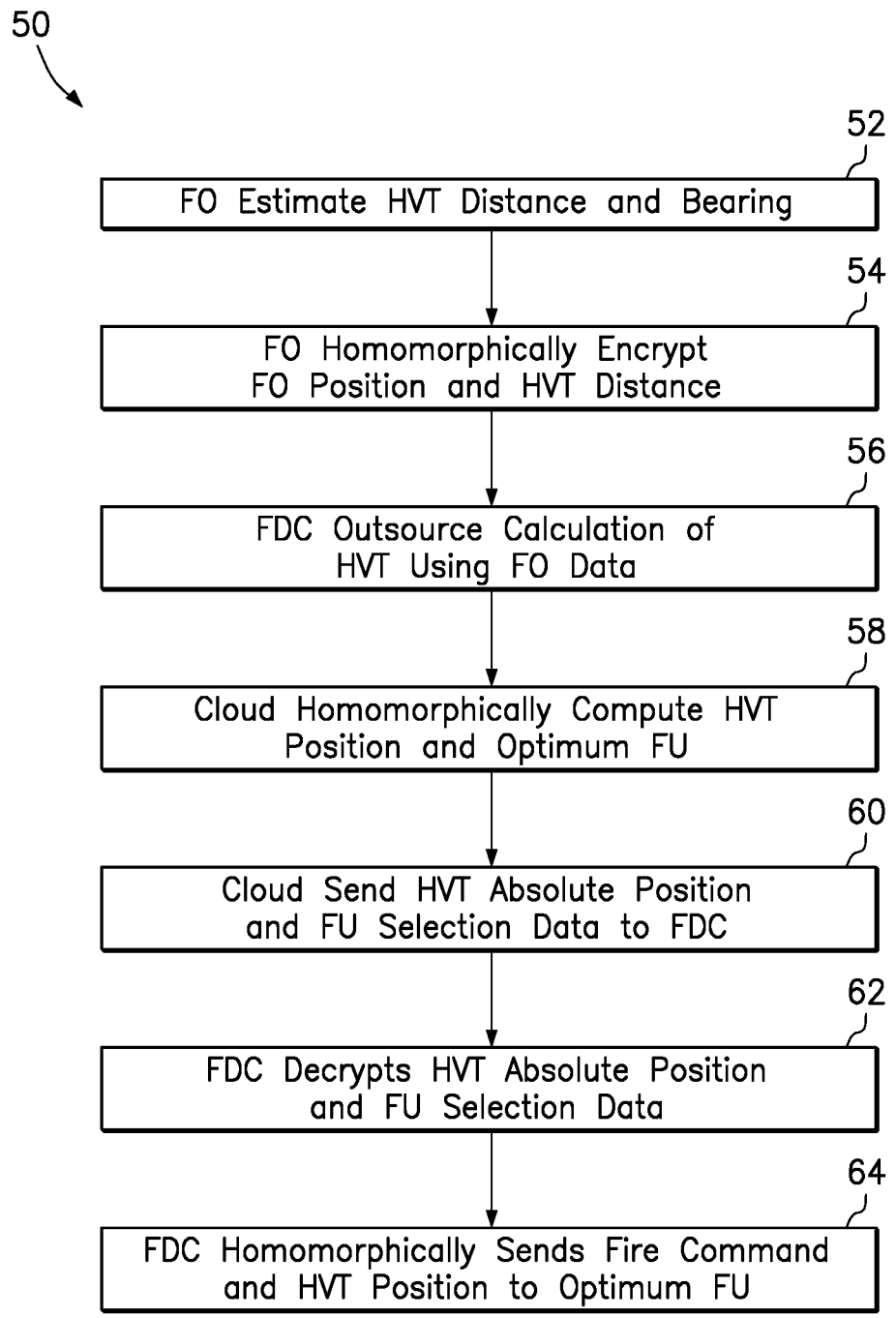
FIG. 4 is a block diagram that can be illustrative of steps that can be taken to accomplish the methods of the present invention according to several embodiments; and, FIG. 5 is a screen shot of the operations of the systems and methods of the present invention when implemented in a computer processor/display configuration.

With the above architecture in mind, and referring now to FIGS. 2-4, specific applications on the Nomad architectures can be implemented. For example, defense organizations may call for indirect/supporting fire during combat operations when an infantry unit is impractical for engagement with a target. In the prior art, every step in the call for indirect fire is an exclusively human activity at the present time. In a tactical environment, the call for indirect/supporting fire procedure can involve multiple players. The Forward Observer (FO) can observe an adversary target, or "High Value Target" (HVT). The FO can determine the Observer Target distance (OT$_{distance}$) and bearing (OT$_{direction}$) using technology such as a laser range finder or other means. The FO can then homomorphically encrypt the (OT$_{distance}$ OT$_{direction}$) as Data$_{ciphertext}$ and can transmit the Data$_{ciphertext}$ to the Fire Direction Center (FDC) via an unsecure cloud. Since the FO location is already known to the FDC, the FDC uses the FO's position and the (OT$_{distance}$, OT$_{direction}$) to calculate the HVT location. Once calculated, the information is sent to the Firing Unit (FU), which can accomplish the indirect fire on the HVT.

Referring again to FIG. 2, systems and method of the present invention, also referred to as CallForFire in the specification, can use the Military Grid Reference System (MGRS) rather than the more widely-known latitude/longitude coordinate system. The reasons for choosing MGRS can be twofold: (1) MGRS is the geo-coordinate standard used by all NATO militaries, which can allow for NATO forces to conduct indirect fire operations, regardless of country of origin, and (2) all MGRS coordinates are alphanumeric with letters and integers which can be more easily handled by all FHE schemes. MGRS coordinates can consist of a grid zone designator (GZD)—a double digit integer followed by a letter, a 100,000-meter square identifier (SQid), which can be in the format of two letters, followed by the numerical location (easting and northing) within the 100,000 meter square-both with the same number of digits, which varies from 1 to 5 depending on the MGRS precision/resolution level. The lowest value 1 can correspond to a precision level of 10 km, while the highest value 5 can corresponds to a precision level of 1 m.

As an example of the above, and referring to FIG. 2, the SQid of FIG. 2 can illustrate both a 100 meter square 46 and a 1 meter square 48. The 100 meter area 46 (if in the extreme upper right corner of the SQid) would have the numerical location 9999, 9999. Area 48 would have the numerical location 99999, 99999. The precision level of 1 m can be used for the systems and methods of the present invention, the CallForFire application. Given a reference point, distance, and bearing, the numerical location of any position in the SQid can be computed.

To compute the HVT location in MGRS, and referring now to FIG. 3, it can be assumed that the GZD and SQid are known. Also assumed is that the FO location within the 100,000-meter square is known and the HVT is within the same square as the FO. Let FO$_{easting}$ and FO$_{northing}$ be the FO's easting and northing values. Similarly, let HVT$_{easting}$ and HVT$_{northing}$ be the HVT easting and northing coordinates. The OT$_{direction}$, θ, can be referenced in a clockwise direction from 0° north (true north), moving clockwise, as shown in FIG. 3. Note that the trigonometric function values (in both degrees and mils) can be pre-computed to four decimal places (which can be sufficient for the present invention, other significant digit precisions could certainly be used), appropriately scaled for computation as integers, and then stored in the FHE-based storage. Trigonometric functions can be precomputed by the systems and methods of the present invention to account for the fact that known FHE methods do not handle division processes particularly well, i.e. the sine and cosine functions when determining the actual position of the HVT in terms or an angle from true north. The HVT's location within the SQid can be calculated using Equations (1) and (2):

$$HVT_{easting} = FO_{easting} + OT_{distance} \times \sin(\theta) \quad (1)$$

$$HVT_{northing} = FO_{northing} + O_{distance} \times \cos(\theta) \quad (2)$$

Referring now to FIG. 4, a block diagram 50 can be shown, which can depict the steps that can be taken to accomplish the methods of the present invention according to several inventions. The method steps (i.e., CallForFire operation workflow) can describe how the call for indirect/supporting fire procedure is simulated by the CallForFire application. CallForFire currently supports the following integer operations in the encrypted domain: addition, subtraction, multiplication, and negation. For this simple scenario, it can be assumed that all locations (except the FDC) are inside of the same MGRS zone (the FDC does not have to be inside the grid). It can also be assumed that the FO, FDC and FU have already obtained the public/private key tuples for communication with the cloud, and that the FDC has the FO and FU public keys, while the FO has the FDC public key.

1. As depicted by block 52, the FO detects an HVT in the field, estimates its distance OT and bearing 8 from true north, and enters the data into the FO client application as Data$_{plaintext}$.

2. Next, and as shown by block 54, the FO client application uses the FDC public key to homomorphically encrypt the FO's location (easting and northing) and the HVT's distance and bearing, and sends them to the FDC via the cloud.

3. The FDC can outsource the computation of the HVT's location to the Nomad cloud service (block 56) by sending the homomorphically encrypted FO's location, the HVT's bearing and distance, and locations of the available FUs over to the cloud using Equation 3.

4. As illustrated by block 58, the cloud homomorphically computes the HVT's absolute location (using Equations (1) and (2) and selects the nearest FU to direct fire on the HVT, based on the smallest value resulting from Equation (3).

5. The cloud sends the HVT's absolute MGRS location and FU selection back to the FDC, as depicted by block 60.

6. The FDC decrypts the HVT's location and the FU selection, then makes the final decision to initiate the firing operation (block 62 in FIG. 4).

7. The FDC encrypts the HVT's location using the FU public key and sends the firing command to the selected FU via the cloud, as shown by block 64 in FIG. 4.

8. The selected FU decrypts the HVT's location and directs fire on the HVT.

The prior art processes of calling for indirect fire is performed entirely by human actors, and the prior art process can involves multiple iterations of equations, potentially making multiple transitions between differing coordinate systems. The call for indirect fire is time sensitive, and the human actors in the FDC are not very fast in carrying out their computations. The systems and methods of the present invention can allow target location and FU assignment, but is a secure manner, even when the network environment is unsecure. CallForFire can place the sensitive computations involved in calling for indirect or supporting fire, specifically computation of a target location, into a secure, homomorphically encrypted cloud environment. The homomorphically encrypted computational environment can reduce insider threat and can guarantee secure operation even in situations where a cloud environment is compromised. Moreover, the use of Fully Homomorphic Encryption gives strong protections to the location privacy and safety of the FO.

Figure 5:
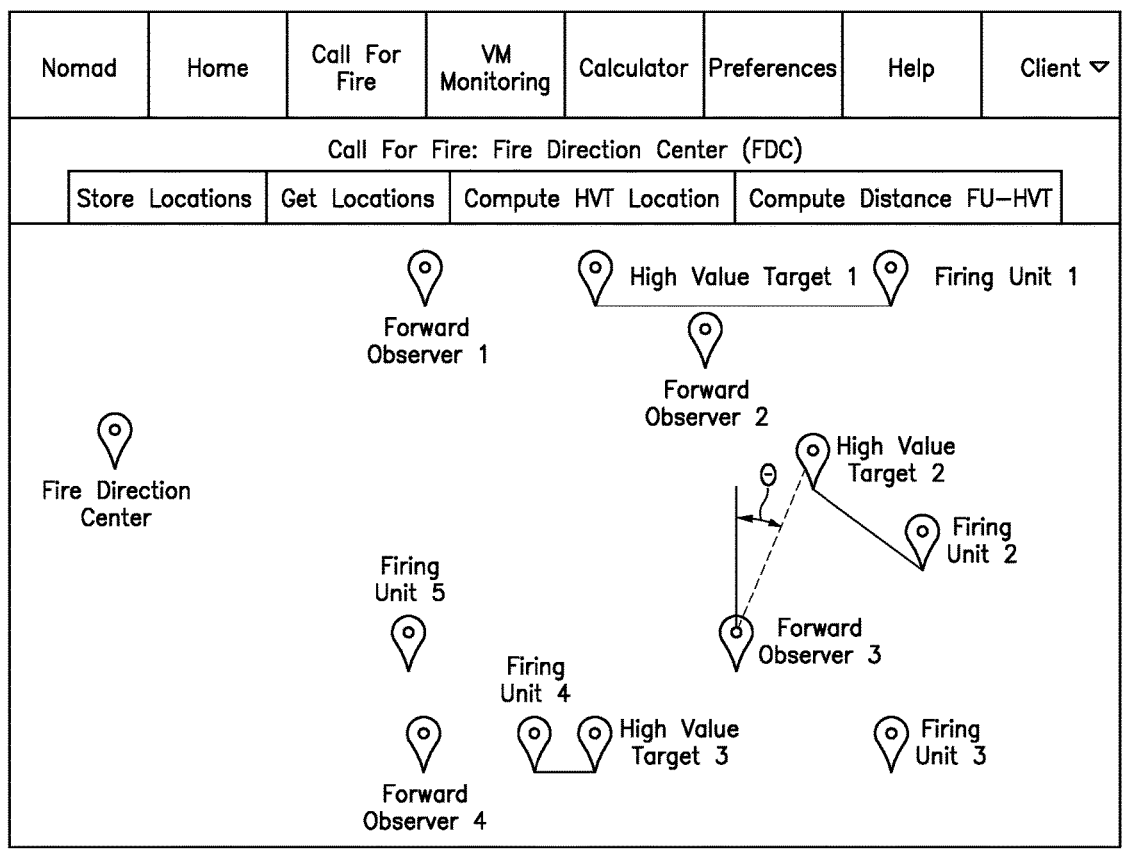

Referring now to FIG. 5, FIG. 5 is a screen shot of a scenario wherein CallForFire can be used by multiple FOs, HVTs and FUs. Initially, and as described above, CallForFire (as used in this Specification "CallForFire" is synonymous with the systems and methods of the present invention) was tested using only a single FO and HVT. In an actual combat environment, and as depicted in FIG. 5, there are likely to be multiple FOs, HVTs, and FUs, and a single FDC would need to process many calls for indirect/supporting fire simultaneously. Therefore, CallForFire can be expanded to handle multiple FOs requesting indirect/supporting fire on adversary HVTs, and selectively assigning the HVTs to different FUs based on predefined criteria (i.e. firing asset selection). The firing asset selection process can involve computing the distances between all FUs and a given HVT, and selecting which FU to direct fire on the HVT. In a real world scenario, asset selection would consist of more criteria than just the distance between the FU and the HVT. It will be assumed that the positions of the FOs and FUs will be known to the FDC. Multiple FOs may call for fire support on the same HVT. The distance can be calculated as follows (Equation 3):

$$\text{Distance FU-HVT} = (FU_{easting} - HVT_{easting})^2 \\ (FU_{northing} - HVT_{northing})^2 \quad (3)$$

The FU-HVT distance can also be outsourced in the same manner as described above, to determine the optimum FU to an HVT, or alternatively to determine which FU(s) to assign to an HVT, when multiple FUs are to be assigned.

The multiple-unit scenario described above for the systems and methods of the present invention were tested using the Nomad architecture. To do this, The Nomad framework is designed to be modular and extensible; using Thrift as the underlying client/server framework (Thrift is an API that can used to abstract away the underlying communication protocol between the client and the server. This can enable an open architecture, and can allow developers to extend the framework, including using different hypervisors for virtual machine management, and choosing different key/value stores for back-end storage. Xen, an open source Linux-based hypervisor, can be used as the underlying hypervisor and LevelDB, a NoSQL database, can be used as the key/value store. GPGPU (General Purpose Graphical Processing Unit)-based acceleration technique as described in a paper by Diallo et al. entitled "Nomad: A Framework For Developing Mission-Critical Cloud-Based Applications" which can use the Nvidia CUDA programming platform, can be implemented for a limited number of subroutines. The contents of the Diallo et al. paper are hereby incorporated by reference herein. For the Client Management Service 12, the CppCMS web development framework can be used to integrate the different C++ libraries including HElib, Thrift, LevelDB, and Nvidia CUDA. OpenLayers can be used as the mapping technology for visualizing the information.

The CallForFire application of the present invention according to several embodiments, was extended. The extension of the application can allows for examination of the performance improvement resulting from HElib batching of operations. In this extension, and as shown in FIG. 5, the number of Forward Observers (FOs), Firing Units (FUs), and observed targets (HVTs) can be all increased. We compute the locations of all the HVTs using the information given by the FOs. Once the locations of all the HVTs are known, which FU to assign to each HVT can then be determined. This determination can be based on the distance between the HVT and the FU. We can then compare the performance between batched and non-batched (individual) calculations. Experiments to analyze the performance of CallForFire with respect to the overhead associated with Computation, Storage, and Data Transmission were performed. The latency between browser and server was ignored.

HElib can use the following main parameters: R (number of rounds), p (plaintext base), r (lifting), d (degree of the field extension), c (number of columns in the key switching matrices), k (security parameter), L (number of levels in the modulus chain), s (minimum number of slots), and m (modulus). For all the experiments, the following parameters are fixed: R=1, r=1, d=1, c=2, and s=0. We adjusted the parameters p and k in order to evaluate the performance tradeoffs associated with having a larger integer space and a higher security level, respectively. The parameters L and m are automatically generated by HElib based on the other parameters. The experiments were performed using two HP Z420 desktops with 16 GB RAM and 500 GB storage, and one MacBook Pro with 2.6 GHz Intel Core i7, 16 GB RAM, and 500 GB storage. The setup is as follows: FO (MacBook), FDC (Z420), Cloud (Z420). The results are shown in Table 1.

TABLE 1

Average Computation Overhead in Sec. with Fixed p = 9576890767 (10 digits)

| | K: Security parameter | | | | | |
|---|---|---|---|---|---|---|
| | 80 (L = 11, m = 11021) | | 100 (L = 11, m = 12403) | | 120 (L = 11, m13019) | |
| Type | Individual | Batched | Individual | Batched | Individual | Batched |
| Location Encryption | 702.3990 | 63.0778 | 782.6890 | 71.8735 | 831.9190 | 77.1963 |
| Location Decryption | 600.7040 | 164.2790 | 692.3490 | 217.0520 | 760.9390 | 217.0620 |
| Location Computation | 212.1974 | 21.3238 | 221.7478 | 27.3559 | 237.1199 | 23.2551 |
| Distance Computation | 271.2946 | 26.3864 | 283.7557 | 28.7946 | 331.0418 | 33.2885 |
| Storing Location | 2.4743 | 0.2498 | 2.7999 | 0.2847 | 2.8119 | 0.2824 |
| Retrieving Location | 16.3833 | 1.5589 | 18.0937 | 1.8003 | 21.8311 | 1.9645 |

CaliForFire Computation Overhead. To measure the computation overhead, two sets of computations were performed: (1) calculation of the HVT's location and, (2) firing asset selection. In the HVT location calculation, the time it took to homomorphically encrypt 10 individual locations consisting of 6 parameters (GZD, SAID, $FO_{easting}$, $FO_{northing}$, $OT_{distance}$, $OT_{direction}$) was measured for each, the numerical location (easting and northing) of the HVT for each FO was computer, and the HVT locations were decrypted. The time it took to store and retrieve 10 encrypted locations from the storage was also measured. In the firing asset selection, the time it took to compute the distance between 10 FUs and 10 HVTs pairwise was measured. Both experiments were repeated 100 times and the averages were computed. Table 2 summarizes the results of these experiments and gives a comparison between the performance of individual and batched operations.

storage system. Based on the results of these experiments, it is best to use batch mode when possible, which can reduce the overhead significantly.

Transmission and Storage Overhead. For the transmission and storage overhead, the time it took for the FO to encrypt and transmit the location information to the FDC, and for the FDC to store the information in its database was measured. Scenarios for 100 FOs were considered and the averages were calculated. The time it takes to transmit an encrypted location and store it in the database can be about 22 times longer than when the location is not encrypted. For the storage space overhead, the average space used to store a location using HE is 8.96 megabytes, whereas the average for a location without using HE is 17.6 bytes. This significant storage space overhead is a limitation common to all lattice-based homomorphic encryption schemes.

TABLE 2

Average Computation Overhead in Sec. with Fixed p = 1000000000039 (13 digits)

| | K: Security parameter | | | | | |
|---|---|---|---|---|---|---|
| | 80 (L = 12, m = 11639) | | 100 (L = 12, m = 12851) | | 120 (L = 12, m = 14279) | |
| Type | Individual | Batched | Individual | Batched | Individual | Batched |
| Location Encryption | 818.4560 | 72.7017 | 850.1300 | 72.3850 | 939.4530 | 84.5170 |
| Location Decryption | 696.9510 | 181.3630 | 738.4030 | 220.9120 | 931.8070 | 303.4390 |
| Location Computation | 227.4829 | 23.1525 | 253.9844 | 25.3798 | 262.6284 | 26.6340 |
| Distance Computation | 287.5192 | 28.1026 | 295.7541 | 27.7043 | 354.8627 | 34.4122 |
| Storing Location | 2.5129 | 0.2454 | 2.7538 | 0.2922 | 3.1536 | 0.3925 |
| Retrieving Location | 16.5563 | 1.7040 | 18.2733 | 1.9397 | 20.7723 | 2.1635 |

From Table 1 and Table 2, it can be seen that, when performing operations in batched mode, an input array with multiple elements is passed in to the storage system. The homomorphic encryption operations can then be performed on all of the elements of the array within the same operation. With individual operations, one data element (i.e. an integer) is placed into the input array, which is then passed to the From the above, it can be seen that CallForFire can take advantage of Nomad's Cloud Storage Service to encrypt and compute enemy target locations in the battlefield. In order to accelerate FHE operations, the use of GPGPU programming techniques to parallelize some of the HElib subroutines can be investigated. The preliminary results can be taken to show some improvement in the performance of HElib. Thus, certain interactive applications, such as CallForFire, can still make use of HElib in a limited context to enhance data confidentiality. Further development of HE libraries such as HElib will likely accelerate the adoption of cloud computing by organizations with sensitive data.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for indirect fire control comprising the steps of:
   A) establishing a grid, said grid for locating a forward observer (FO), a high value target (HVT) and a firing unit (FU);
   B) determining the respective grid coordinates of said FO and said FU in relation to the grid;
   C) estimating the position of said HVT in said grid relative to said FO, said estimating step being accomplished by said FO, thereby providing HVT estimated position data;
   D) fully homomorphically encrypting, using a batch mode and parallelizing at least one HElib subroutine, said HVT estimated position data by said FO, thereby providing encrypted HVT estimated position data;
   E) transmitting said encrypted HVT estimated position data over a cloud network architecture to a Fire Direction Center (FDC);
   F) outsourcing the calculation of an absolute position of said HVT in said grid to an internet cloud architecture, using said encrypted HVT estimated position data and said FO position data, said outsourcing step being performed by said FDC, said FO position data being encrypted prior to said outsourcing, thereby providing encrypted HVT absolute position data;
   G) transmitting said encrypted HVT absolute position data from said internet cloud architecture to said FDC; and,
   H) decrypting said encrypted HVT absolute position at said FDC, thereby providing decrypted HVT absolute position data.

2. The method of claim 1, wherein said FO, FDC, and FU each have a $Key_{public}$, $Key_{private}$, and wherein said step C) is accomplished by said FO and said step D) is accomplished by said FO using said $Key_{public}$ of said FDC.

3. The method of claim 2, further comprising the steps of:
   fully homomorphically encrypting said HVT absolute position at said FDC; and,
   transmitting said encrypted HVT absolute position to said FU, using said $Key_{public}$ of said FU.

4. The method of claim 1, wherein said grid is a military grid reference system (MGRS).

5. The method of claim 1, wherein said fully homomorphic encryption is Brakerski-Gentry-Vaikuntanathan cryptosystem (BGV) encryption.

6. A method for transmitting indirect fire control protocol information between a Forward Observer (FO), a Fire Direction Center (FDC), and a Firing Unit (FU) over unsecure network architecture, comprising the steps of:
   A) assigning a respective $Key_{public}$, $Key_{private}$ tuple to each of said FO, FDC, and FU;
   fully homomorphically encrypting, using a batch mode and parallelizing at least one HElib subroutine, High Value Target (HVT) estimated grid position data by said FO, thereby providing encrypted HVT estimated grid position data;
   B) transmitting the encrypted High Value Target (HVT) grid estimated position data from said FO to said FDC, said transmitting step being accomplished using said $Key_{public}$ tuple;
   C) outsourcing the calculation of an absolute grid position of said HVT in said grid to an internet cloud architecture, using said encrypted HVT estimated grid position data and grid position data of the FO, said outsourcing step being performed by said FDC, said FO grid position data being encrypted prior to said outsourcing, thereby providing encrypted HVT grid absolute position data that was calculated using encrypted said FO grid position data and said encrypted HVT estimated grid position data as inputs;
   D) receiving said encrypted HVT absolute position data from said internet cloud architecture at said FDC;
   E) decrypting said HVT absolute position at said FDC, thereby providing decrypted HVT absolute position data; and,
   F) transmitting said decrypted HVT absolute position data to said FU, using said FU $Key_{public}$ tuple, said transmitting step being accomplished by said FDC.

7. The method of claim 6, wherein said grid is a military grid reference system (MGRS).

8. The method of claim 7, wherein said homomorphic encryption is Brakerski-Gentry-Vaikuntanathan cryptosystem (BGV) encryption.

9. The method of claim 1, where said parallelizing in said outsourcing step is accomplished using on a General Purpose Graphics Processing Unit (GPGPU).

10. The method of claim 6, where said parallelizing in said outsourcing step is accomplished using on a General Purpose Graphics Processing Unit (GPGPU).

* * * * *